(12) United States Patent
Lu et al.

(10) Patent No.: US 12,278,339 B2
(45) Date of Patent: Apr. 15, 2025

(54) SOLID-STATE BATTERY WITH SOLID ELECTROLYTE SURFACE TOPOGRAPHY DESIGN

(71) Applicant: GM GLOBAL TECHNOLOGY OPERATIONS LLC, Detroit, MI (US)

(72) Inventors: Yong Lu, Pudong (CN); Zhe Li, Pudong (CN); Dewen Kong, Minhang (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1411 days.

(21) Appl. No.: 16/544,992

(22) Filed: Aug. 20, 2019

(65) Prior Publication Data
US 2021/0057776 A1   Feb. 25, 2021

(51) Int. Cl.
*H01M 10/058* (2010.01)
*H01M 10/0525* (2010.01)

(52) U.S. Cl.
CPC ..... *H01M 10/058* (2013.01); *H01M 10/0525* (2013.01); *H01M 2300/0065* (2013.01)

(58) Field of Classification Search
CPC ............. H01M 10/58; H01M 10/0562; H01M 10/058; H01M 10/0525; H01M 2300/0065; H01M 10/0585; H01M 2004/027; H01M 2004/028; H01M 4/62; H01M 2300/0071; Y02E 60/10; Y02P 70/50
See application file for complete search history.

(56) References Cited

U.S. PATENT DOCUMENTS 11,121,375 B2   9/2021   Hou et al.
2019/0044186 A1 *   2/2019   Kim .................... H01M 50/403

\* cited by examiner

*Primary Examiner* — Ula C Ruddock
*Assistant Examiner* — Sarika Gupta
(74) *Attorney, Agent, or Firm* — Harness, Dickey & Pierce, P.L.C.

(57) ABSTRACT

A solid-state battery cell, such as a lithium-ion cell, is assembled with a solid electrolyte layer member positioned between co-extensive surface layers of an anode active layer member and a cathode active material layer member. At least one of the engaging surfaces of the solid electrolyte layer is not flat. It is formed with a topographical pattern comprising recesses in a flat surface, or a surface of projections and recesses, and placed against a compatibly-shaped, mating surface of the anode layer and/or the cathode layer. The re-shaping of the surface(s) of the solid electrolyte layer and adjoining electrode layer(s) is to significantly increase the effective contact area with the facing layer of electrode material and improve the conduction of ions across the interface. A thin film of interlayer material may be placed between the surfaces of the facing cell members with the specially shaped adjacent faces.

11 Claims, 4 Drawing Sheets

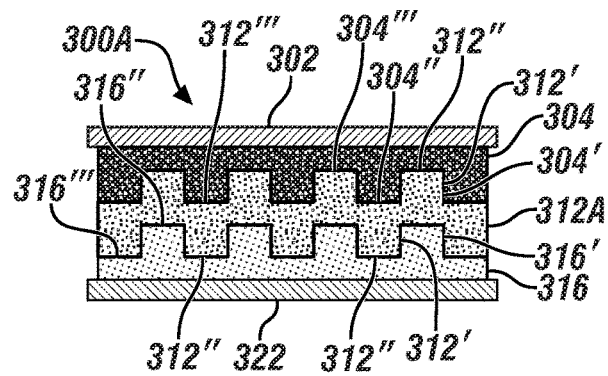
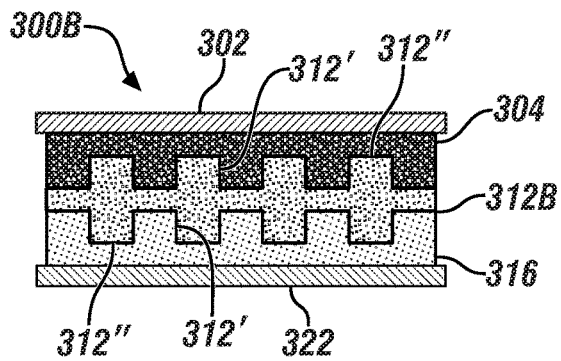
FIG. 3A
FIG. 3B
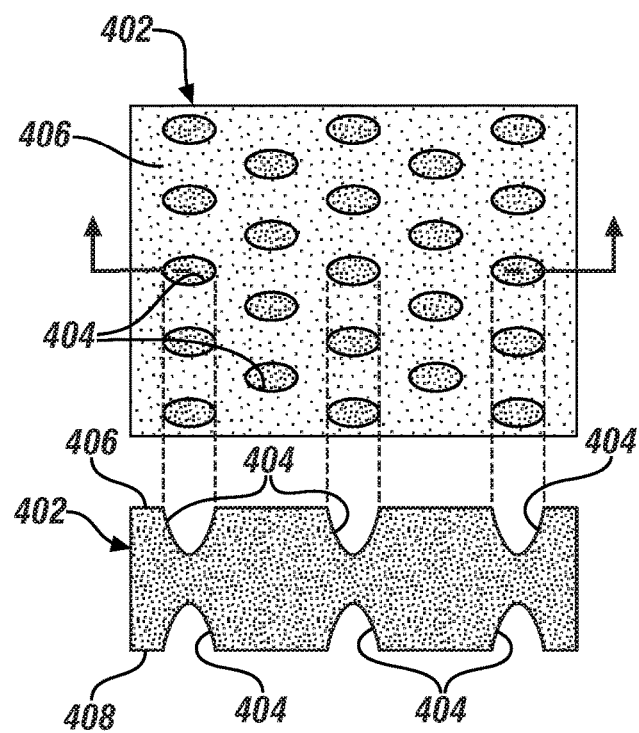
FIG. 4A
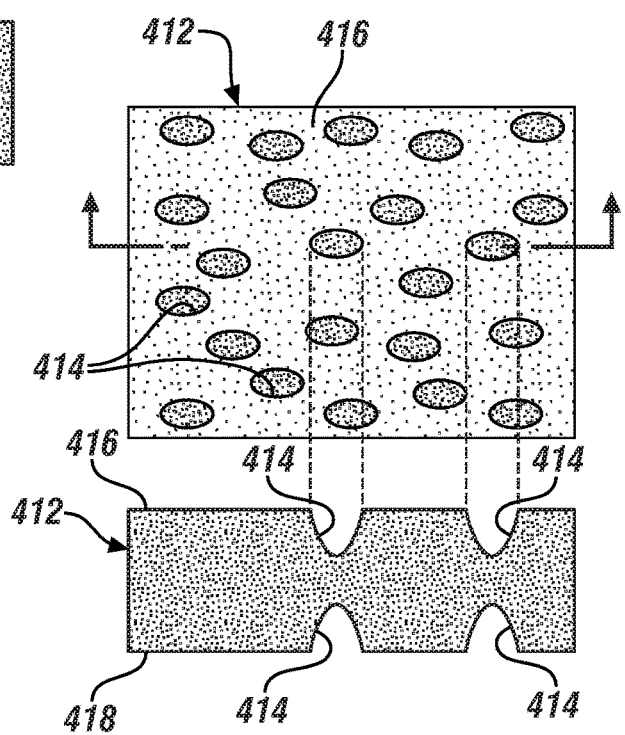
FIG. 4B

SOLID-STATE BATTERY WITH SOLID ELECTROLYTE SURFACE TOPOGRAPHY DESIGN

INTRODUCTION

Solid-state batteries, including lithium-ion batteries, can be composed and formed to provide effective energy for powering electric motor driven vehicles and for powering many other consumer products. For commercial applications, it is often desirable to increase power/energy densities of such lithium-ion battery cells by using solid electrolytes. In existing solid-state lithium-ion electrochemical battery cells, for example, a thin, flat, porous, particulate layer of anode material is bonded to one flat side of a thin, porous, particulate layer of solid electrolyte material, and a thin, flat, porous, particulate layer of cathode material is bonded to the opposite flat side of the solid electrolyte layer (also known as a separator layer). The flat thin layers of opposing-charge electrode materials and the interposed layer of electrolyte material are shaped alike in their two-dimensional configuration (often rectangular) and are co-extensive in their assembled layered cell package. The thicknesses of the respective material layers depend on their respective specified capacities in their electrical current generation function in the assembled electrochemical solid-state battery cell and/or the power capability requirements.

The small particles in the respective layers of cell material typically have maximum characteristic dimensions in the nanometer to micrometer size-range. The surfaces of the formed porous particulate cell member layers are relatively flat, but they still suffer from the insufficient contact between particles at the surfaces of each layer of electrode material and the interposed solid electrolyte material layer. Thus, the transport of ions (lithium ions in a lithium battery cell) between facing surfaces of the electrode layers and the solid electrolyte layer is affected by the poor macro-interface between the layer of anode material and the solid electrolyte layer and between the layer of cathode material and the opposite side of the solid-electrolyte layer. And also, the ion transport distance directly relates to the thickness of the solid electrolyte layer. However, it is still a challenge to prepare a thinner solid electrolyte layer with high mechanical strength due to its brittle nature, especially for an oxide-based solid electrolyte. As a result, the power density of solid-state battery is still a problem.

Therefore, there is a need to improve the nature of such macro-interfaces and the lithium ion (in the case of lithium cell) and associated anions transport distance and efficiency between electrode material layers and the solid electrolyte layer in each cell of a lithium-ion battery and of similar solid-state battery cells. In this way, we are capable of improving the power capability of solid-state battery.

SUMMARY OF THE DISCLOSURE

In an illustrative initial example, a solid-state lithium-ion battery cell is formed using a rectangular, uniformly-thick anode layer that comprises particles of anode active material (e.g., graphite particles) mixed with like-sized (or compatibly sized) particles of a solid electrolyte such as $Li_7La_3Zr_2O_{12}$ (shortened as LLZO in this specification), a like-shaped, uniformly-thick cathode layer that includes cathode active material particles, such as high-voltage providing, 5V, $LiNi_{0.5}Mn_{1.5}O_4$ particles (sometimes LMNO in this specification), mixed with particles of a solid electrolyte (such as LLZO). The anode layer and cathode layer are placed against opposite coextensive faces of a compatibly-shaped, uniformly thick layer of solid-electrolyte particles (such as LLZO).

In this example, the composition of the solid electrolyte layer, and the compositions of solid electrolyte particles mixed with both the anode and cathode active material particles, are the same material. But this is not a requirement of the practices of this disclosure.

The electrode and electrolyte particles are typically made or produced in roughly spherical shapes, with largest dimensions in the range of about 2 nanometers to about 1000 micrometers. The cell-member active particles may optionally be mixed with other components such as a polymer binder and conductive particles so that a measured quantity of the mixture can be molded and formed into a shaped layer of the intended cell member. The thicknesses of the respective cell member layers (typically in the range of about 5-1000 micrometers for one layer) are based on their composition and their required electrochemical capacity and/or power capability in the cell unit. Such a basic cell unit may be electrically interconnected with like cell units to achieve a desired multi-cell battery voltage, power, and energy. The performance of the electrochemical cell requires good conduction of lithium cations. And the substantially flat, micro-roughened interface between the particulate electrode layer member and the particulate electrolyte layer member provides a significant resistance to the required conduction of ions between the facing layers.

In some embodiments of this disclosure, a thin molded interlayer film (e.g., a few micrometers in thickness) is placed between the surface of an anode layer or cathode layer (or both surfaces) and the facing surface of the selected interposed solid electrolyte material. An example of such an interlayer film is polyethylene oxide (PEO)-bonded, lithium bis-(trifluoromethane sulfonyl) imide (LiTFSI). But it is still desired to increase the surface contact area of at least some of the facing, particulate members of the solid-state cell.

In accordance with practices of this disclosure, the thin layer of solid electrolyte material (often rectangular in shape) is molded and formed such that one or both of its electrode member layer-facing surfaces is/are shaped with a predetermined surface topography that is determined to suitably increase interfacial contact area with a facing layer of anode active material, a facing layer of cathode active material, or both facing layers of electrode material. And also, it is determined to shorten the relative ion transport (typically, lithium ions) distance through the solid electrolyte layer, between electrode layers during charge/discharge processes.

The surface topography of the solid electrolyte layer is characterized by a pattern of ups/downs, hills/valleys, or like projections/recesses or indentations in the solid electrolyte surface. In another embodiment, a pattern of recesses or indentations is formed in an otherwise flat surface. It is preferred that the minimum dimensions of the recesses or indentations be larger than the sizes of the individual particles forming the solid electrolyte layer. The selected surface topography pattern is formed in one or both of the major surfaces of the thin solid electrolyte layer. And a mating, complementary, inter-fitting, or interlocking, pattern is formed in the surface of the facing layer of anode active material and/or the surface of the facing layer of cathode active material. The configured facing surfaces of such cell material layers fit closely together in enlarged-contacting surface area with face-to-face contact. In cell assemblies in which an interlayer film is interposed between an electrode layer and the electrolyte layer, the thin film is deformed in accordance with the inter-fitting surface topographies of the cell members that are assembled and pressed against it. The dimensions of the elements of surface topography (the recesses or combinations of projections and recesses or indentations) are large enough to be readily formed in the surfaces of the facing battery cell member layers. For example, the elements of the surface topography will typically be visible to the human eye.

Examples of several recesses and/or of upstanding-portions and associated downwardly-directed portions of the solid electrolyte and facing electrode member topographically-designed surfaces are illustrated in drawing figures of this specification and described in the related text. In one embodiment, the recesses or upwardly projected portions and associated downwardly directed portions may be formed in the nature of parallel strips that extend across the cell member, from one side to the opposing side of the solid electrolyte layer and a facing electrode layer. The cross-section of each strip may, for example be in the nature of like-rounded valleys or of like-rounded waves or curves. In another example, the upwardly-projecting strips may be in the form of columns or walls with generally flat tops and straight-line sides. The pattern of the parallel strips may be uniformly ordered, or strategically dis-ordered, across the surfaces of the facing cell members. Many individual, up-standing projections, with adjoining valleys, may be formed in ordered or disordered patterns across the surface of the facing cell members in a strategic topographical design to suitably and significantly increase the contact area for transport of lithium ions across the interface between the cell members and to shorten the ion transport distance.

In still another example, one or both faces of the solid electrolyte layer member may be formed with a pattern of valleys or recesses or indentations in an otherwise flat surface, and the facing surface of an anode layer member or cathode layer member may be formed with corresponding projections that fill each of the recesses in the solid electrolyte in an assembled cell. The recesses may have curved sides and bottoms, or straight sides and bottoms, or combinations of such surfaces.

The dimensions of the projections and recesses are suitably consistent with the thicknesses of the solid electrolyte layers and the electrode material layers on which the topographical designs are formed. As stated above in this specification, the thicknesses of the layers of cell material are typically in the range of about five micrometers to about 1000 micrometers (1 mm). The heights of the projections or the depths of the recesses are suitably less than about one-half the generally uniform overall thickness of the layer of solid electrolyte material or the overall thickness of the facing layer of electrode material. And the spacings of the centers of the projections and recesses, whether ordered or dis-ordered, are up to about five times the selected heights of the projections or depths of the recesses.

Accordingly, facing surface contact areas between a solid electrolyte layer and an anode particulate material layer and/or a cathode particulate material layer may be significantly increased by suitable topographical designs of the facing surfaces. And the facing surfaces of the cell members may be engaging a deformable interlayer film that takes the shapes of the cell member layer surfaces. But the intention and purpose of each suitable topographical design is to improve and increase interfacial area of the facing cell members to enable increased transport of ions across the cell member interfaces and shorten the ion transport distance between electrode layers during the discharging and re-charging of the battery cell or interconnected cells.

Of course, an assembled battery may be assembled with a plurality of cells in series and/or parallel electrical connections to enable the voltage and energy delivery requirements of the battery. The above described and like or equivalent modifications of facing surfaces of cell members can significantly improve the performance of each cell.

Further detailed descriptions and illustrations of the modification of the surface topographical design of the surfaces of solid electrolyte layer members and facing anode and cathode layer members are presented in the following paragraphs of this specification and the associated drawing figures.

BRIEF DESCRIPTION OF THE DRAWINGS

In FIG. 2A, one facial side of the solid electrolyte layer and the adjoining facial side of the anode material layer are formed with a topographical pattern of fully inter-fitting, equally spaced, like sized and shaped, parallel rows of hill-like projections and intervening valley-like recesses. The opposing facial side of the solid electrolyte layer and the contacting facing side of the cathode layer are flat.

In FIG. 2B, both facial sides of the solid electrolyte layer and the facing sides of the anode layer and the cathode layer are formed with a topographical pattern of fully inter-fitting, equally spaced, like sized and complementary, inter-fitting shaped, parallel rows of projections and valleys.

FIG. 2C. is like that of FIG. 2A except that an interlayer film has been placed between the topographically patterned, facing surfaces of the anode layer and the solid electrolyte layer and the flat facing surfaces of the solid electrolyte layer and the cathode layer.

FIG. 2D is like that of FIG. 2B except that an interlayer film has been placed between topographically patterned, facing sides of the anode and cathode layers and the facing, complementarily-shaped, topographically-patterned faces of the solid electrolyte layer.

FIGS. 3A and 3B are simplified, enlarged, schematic, cross-sectional views of a cell of a solid-state lithium-ion battery like that illustrated in FIG. 1. In these figures, the upstanding, equally-spaced rows of projections are rectangular in profile and in cross-section. In FIG. 3A, the locations of the parallel rows of projections between the anode member and the solid electrolyte member, and the locations of the rows of projections between the cathode member and the solid electrolyte member, are not directly opposite each other, they are spaced apart. The centers of the projections are offset by the width of the projections. In FIG. 3B, the locations of centers of the parallel rows of projections on the opposite sides of the solid electrolyte layer are aligned.

FIGS. 4A-4D illustrate, respectively, top views and side views of some arrangements of individual rounded valley-shaped recesses, and rows of valley-shaped recesses, of exemplary topographical patterns formed in the initially flat facial surface(s) of a solid electrolyte layer. The adjoining faces of an anode member and cathode member to be assembled against the solid electrolyte layer would have mating patterns of complementary projections to fit into the recesses in the faces of the illustrated solid electrolyte member.

FIG. 4A illustrates an ordered pattern of parallel rows of individual valley-like recesses formed in a face of a solid electrolyte member. FIG. 4B illustrates a disordered pattern of parallel rows of individual valleys formed in a face of a solid electrolyte member. FIG. 4C illustrates an ordered pattern of parallel rows valleys on a face of a solid electrolyte member. And FIG. 4D illustrates a dis-ordered pattern of parallel rows of parallel valleys formed in a face of a cell member.

DETAILED DESCRIPTION

Figure 1:
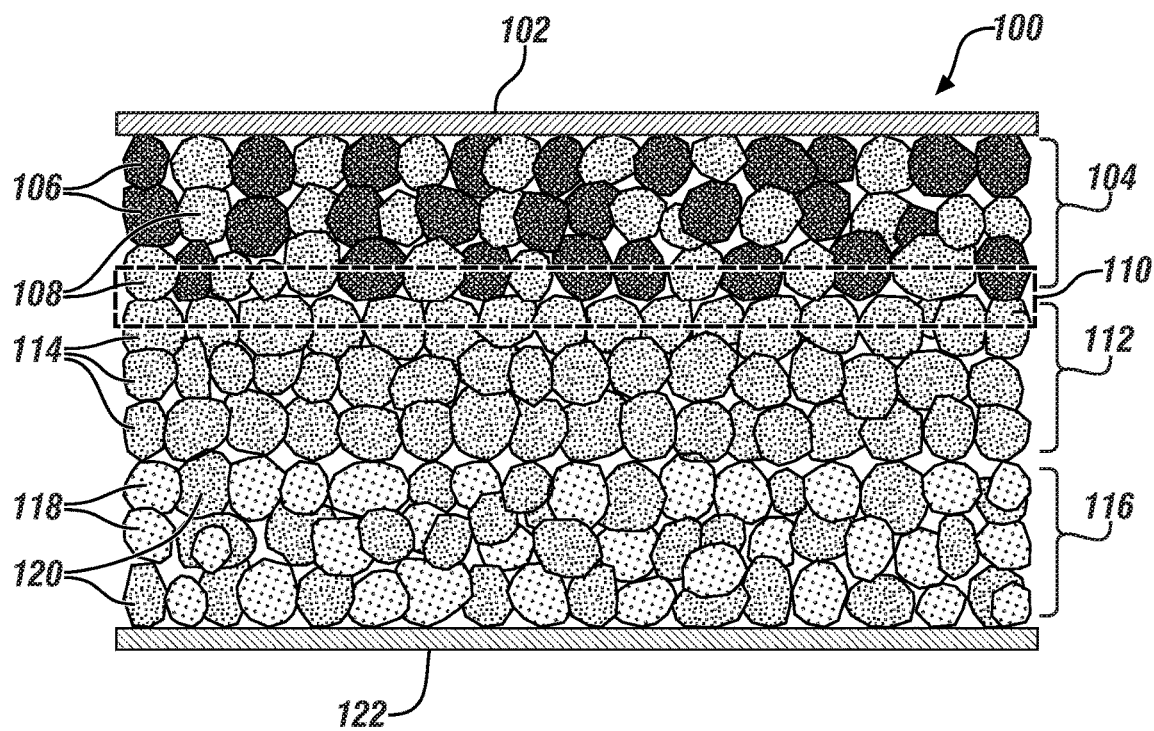
FIG. 1 is a schematic, significantly enlarged, cross-sectional view of a cell of a solid-state lithium-ion battery of previously proposed construction. This illustrated battery cell is a five-layer structure of substantially like-shaped (rectangular), overlying, flat surface-facing layers of different (but uniform) thicknesses and different material compositions. Starting from the top layer illustrated in FIG. 1 and proceeding downwardly—the top member is a non-porous nickel or copper current collector foil with its lower side in coextensive contact with a surface of a particulate anode material layer. The anode material layer contains a mixture of particles of anode active material and particles of a solid electrolyte material. The opposite side of the anode layer lies in coextensive contact against one side of a layer of particles of solid electrolyte material. The fourth layer is a cathode layer which contains particles of cathode active material uniformly mixed with particles of a solid electrolyte material. The bottom layer of the battery cell is a non-porous aluminum current collector foil with one side in substantially coextensive contact with one side of the cathode layer.

In FIG. 1, a lithium-ion battery cell 100 of previously known construction is illustrated. Starting at the top of the figure, a thin, solid (non-perforated) current collector foil 102 has a uniformly thick, layer of anode material 104 co-extensively bonded to its lower side. In an assembled battery, comprising more than one cell, a like layer of anode material (or cathode material in a bipolar cell) would likely be placed, coextensively, against its opposite side, its top side as illustrated in FIG. 1. The contact, which may be a resin-bonded contact (not illustrated), is such that, during cell operation, electrons enter the current collector 102, from the anode material layer 104 during cell discharge, flowing from an optional smaller tab (not illustrated) at one side or edge of the current collector foil to an electrical energy consuming device. Thus, during cell discharge, anode current collector 102 is negatively charged. Anode current collector 102 is often a nickel or copper foil having a thickness of about five to fifty micrometers and a two-dimensional shape corresponding to the required shape and area of the attached anode material.

Anode material layer 104 is an intimate mixture (optionally a resin-bonded mixture also including conductive particles, not illustrated to simplify the description) of nanometer-size to micrometer-size particles of anode active material, for example graphite particles 106 (dark with small white dots), intimately mixed with like-size particles of a selected solid electrolyte 108 (scattered black dots in a white background). In this example, an illustrative composition of the solid electrolyte particles 108, intimately mixed with the graphite anode material particles 106, is LLZO.

In the embodiment of FIG. 1, the opposite side of the generally flat surface layer of anode material 104 is in face-to-face, coextensive contact with a flat facial surface of a solid electrolyte layer 112 of solid electrolyte particles 114 (optionally, also resin-bonded). In this example, the composition of the solid electrolyte particles 114 (LLZO) of the solid electrolyte layer 112 is the same as the composition of electrolyte particles 108 used in the anode layer 104.

The bracketed region 110 of FIG. 1 is to draw attention to the generally flat sides of the facing and contacting surfaces of the particulate layer of anode material 104 and the particulate layer of the solid electrolyte material 112. In the enlarged illustration of FIG. 1, the diameters of the particles are a few millimeters in size, so the surfaces do not appear to be particularly flat. But the actual sizes of the anode material particles and the solid electrolyte particles are in the nanometer to micrometer range and the actual surfaces of the electrode layers and electrolyte layer of the cell are relatively smooth. Still, the irregular shapes of the particles and the inherent porosity of the respective layers tend to reduce the contacting surface area between the electrode layers and the solid electrolyte layer and to increase resistance to the required flow of lithium ions between the layers during discharging and recharging of lithium-ion battery cell.

Placed in intimate, coextensive contact with the flat opposite side of solid electrolyte layer 112, is a co-extensive flat layer 116 of cathode material. Cathode material layer 116 is suitably formed of a mixture of nanometer-size to micrometer-size particles of cathode active material 118 (organized black dots in a white background) and particles of suitable solid electrolyte material 120 (scattered black dots in a white background). Again, in this embodiment, particles of the same solid electrolyte material are used in a mixture with the cathode active material 118. An example of the composition of a suitable cathode active material is $LiNbO_3$-coated $LiNi_{0.5}Mn_{1.5}O_4$, and a suitable compatible solid electrolyte material 120 is LLZO. Attached in face-to-face-coextensive contact with the opposite flat side of cathode layer 116 is a flat cathode current collector foil 122 for connection with an energy requiring device. In an assembled battery, comprising more than one cell, a like layer of cathode/anode material would likely be placed, coextensively, against its opposite side, the bottom side of cathode current collector foil 122 as illustrated in FIG. 1. Cathode current collector foil 122 is often a non-perforated aluminum foil having a thickness of about five to fifty micrometers and a two-dimensional shape corresponding to the required shape and area of the attached cathode material layer. It may be formed with a tab (not illustrated). During cell discharge, cathode current collector displays a positive electrical charge.

As stated above in this text, a goal of this disclosure is to increase the surface area of contact between at least one surface of the solid electrolyte layer and a facing layer of electrode material and to shorten the lithium ion transport distance. The following text and drawing figures describe practices by which this goal is achieved.

Figure 2A:
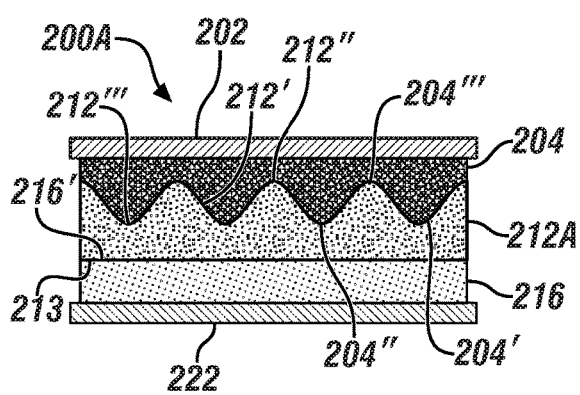
FIGS. 2A-2D are simplified, enlarged, schematic, cross-sectional views of a cell of a solid-state lithium-ion battery with rectangular cell member layers, like that illustrated in FIG. 1.

In simplified, schematic, cross-sectional illustration of FIG. 2A, a five-member cell 200A comprises anode current collector 202 attached to one side of a layer of anode material 204. The layer of anode material 204 is composed of a mixture of particles of anode active material and solid electrolyte material, as described with respect to anode material layer 104 in FIG. 1. The other side of the layer of anode material 204 lies in face-to-face contact with a side of a solid electrolyte layer 212A. The layer of solid electrolyte particles 212A is composed as described with respect to solid electrolyte layer 112 in FIG. 1. The other side of solid electrolyte layer 212A is flat and lies in face-to face contact with a flat layer of cathode material 216 which has a cathode current collector foil 222 affixed to its opposite flat side as illustrated in FIG. 1.

In the embodiment of FIG. 2A, the opposite side of solid electrolyte layer 212A is formed with a flat surface for face-to-face contact with a flat facing surface of cathode layer 216. However, the anode layer facing surface 212' of solid electrolyte layer 212A is formed with uniformly spaced rows of curved projections 212" with aligned and interposed uniformly inversely-shaped valleys 212'''. And the facing side 204' of anode layer 204 is formed a mating pattern of uniformly spaced rows of curved projections 204" that fit into the valleys 212''' of facing surface 212' of solid electrolyte layer 212A. The facing side 204' of the anode layer 204 has uniformly spaced valleys 204''' which receive projections 212" on the face 212' of solid electrolyte layer 212A when the cell 200A is assembled. Thus, the contacting surface area between anode layer 204 and solid electrolyte layer 212A is substantially increased as compared to contacting flat surfaces. The relative ion transport distance in the solid electrolyte layer 212A is shortened.

Figure 2B:
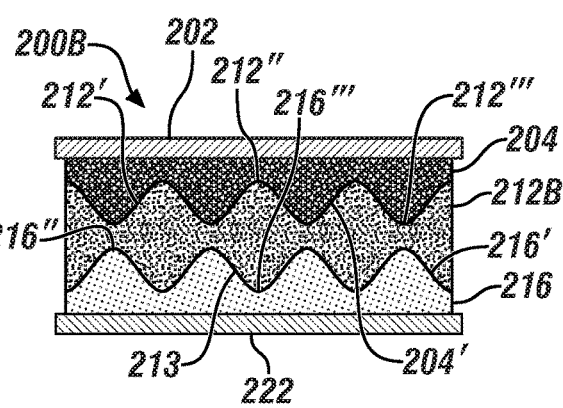
Figure 2C:
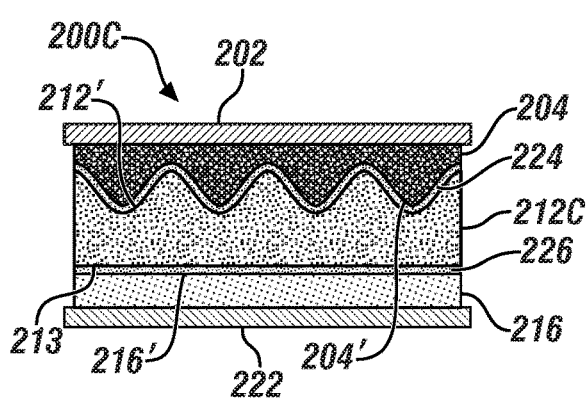

The embodiment illustrated in FIG. 2C is similar to that of FIG. 2A except that a thin (micrometer size) flexible interlayer film 224 has been placed between the topographically modified (as compared with the traditional flat face) anode layer face 204' and compatibly-modified face 212' of the solid electrolyte layer 212. And a like thin flexible interlayer film 226 has been placed between the flat facing surface 216' of cathode layer 216 and the flat surface 213 of solid electrolyte layer 212A.

In the embodiment illustrated in FIG. 2B, both faces 212', 213 of the solid electrolyte layer 212B have been formed with the same pattern of uniformly-spaced rows of projections 212" with reverse-shaped intervening valleys 212'''. And the facing surface 216' of the cathode layer 216 has been formed with a mating, inter-fitting pattern of uniformly-spaced rows of projections 216" and intervening valleys 216'''.

Figure 2D:
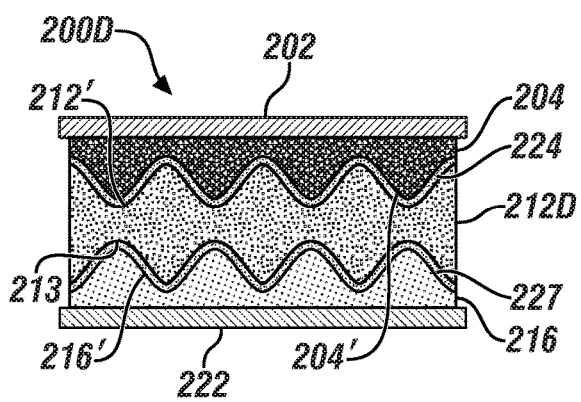

The embodiment illustrated in FIG. 2D is like that of FIG. 2B except that an interlayer film 224 has been placed between the topographically modified (as compared with the traditional flat face) anode layer face 212' and compatibly-modified face 212' of the solid electrolyte layer 212. And a second interlayer film 227 has been placed between the like topographically modified facing surface 216' of cathode layer 216 and the compatibly-modified lower surface 213 of the solid electrolyte layer 212D.

In the embodiment of FIG. 2B, the rows of projections on the opposing faces of the solid electrolyte layer 212B are aligned. The parallel rows of projections are directly opposite each other. But in other embodiments of topographical surface designs, such projections are not necessarily directly opposite to each other. The locations of the parallel rows of projections between the anode member 204 and the solid electrolyte member 212B, and the locations of the rows of projections between the cathode member 216 and the solid electrolyte member 212B may spaced apart. They may also sit between aligned and not-matched positions with respect to each other.

FIGS. 3A and 3B are simplified, enlarged, schematic, cross-sectional views of a cell of a solid-state lithium-ion battery similar to that illustrated in FIG. 1.

In these figures, the upstanding, equally-spaced rows of projections and intervening valleys are rectangular in cross-section.

In simplified, schematic, cross-sectional illustration of FIG. 3A, a five-member cell 300A comprises anode current collector 302 attached to one side of a layer of anode material 304. The layer of anode material 304 is composed of a mixture of particles as described with respect to anode material layer 104 in FIG. 1. The other side of the layer of anode material 304 lies in face-to-face contact with a face of a solid electrolyte layer 312A. The layer of solid electrolyte particles 312A is composed as described with respect to solid electrolyte layer 112 in FIG. 1. The other side of solid electrolyte layer 312A lies in face-to face contact with a layer of cathode material 316 which has a cathode current collector 322 affixed to its opposite side as illustrated in FIG. 1.

In FIG. 3A, the anode layer facing surface 312' of solid electrolyte layer 312A is formed with uniformly spaced rows of projections 312" with rectangular cross-sections and with aligned and interposed uniformly shaped, rectangular-cross-sectioned valleys 312'''. And the facing side 304' of anode layer 304 is formed with an inter-fitting, mating pattern of uniformly spaced rows of rectangular cross-section projections 304" that are positioned to fit into the rectangular valleys 312''' of facing surface 312' of solid electrolyte layer 312. The facing side 304' has uniformly spaced valley rows 304''' which receive projections 312" on the face 312' of solid electrolyte layer 312 when the cell 300A is assembled.

In the embodiment illustrated in FIG. 3A, both faces 312' of the solid electrolyte layer 312A have been formed with the same pattern of uniformly-spaced rows of rectangular cross-section projections 312" with reverse-shaped intervening valleys 312'''. And the facing surface 316' of the cathode layer 316A has been formed with a mating, inter-fitting pattern of uniformly-spaced rows of rectangular projections 316" and like-shaped intervening valleys 316'''. But, in this embodiment the rows of projections on the opposing faces of the solid electrolyte layer 312A are not directly opposite each other. In FIG. 3A, the locations of the parallel rows of projections between the anode member 304 and the solid electrolyte member 312A, and the locations of the rows of projections between the cathode member 316 and the solid electrolyte member 312A, are not matched, they are spaced apart.

In FIG. 3B, the locations of the parallel rows of projections 312' on the opposite sides of the solid electrolyte layer 312B are aligned.

In other embodiments, the parallel rows of projections on the opposite faces of solid electrolyte layer 312 may be positioned between aligned and un-aligned positions.

In other embodiments of this disclosure, like those of FIG. 3, a thin interface layer (not illustrated) can be placed between the solid electrolyte layer 312 and cathode electrode layer 316 and/or anode electrode layer 304.

In the embodiments illustrated in FIG. 2A-2D and FIG. 3A-3B, the cross-sectional shapes of projections and valleys are not limited to rectangular shapes or rounded curves. They may be in the shapes of trapezoid, semi-sphere, polygons and so on. On the other hand, the anode layer and cathode layer are relatively placed at the opposite two sides of the solid electrode layer. The embodiments herein are just for the purpose of initial, representative illustrations. To be specific, in a variation of the embodiment of FIG. 2A, an interlayer may be placed between a flat cathode layer surface and a flat solid electrolyte layer surface.

FIGS. 4A-4D illustrate, respectively, top views and indicated cross-sectional views of some arrangements of individual valleys and rows of valleys in both opposing flat surfaces of a solid electrolyte layer. These are further examples of topographical patterns for the facial surface(s) of a solid electrolyte layer and for like mating patterns for a facing surface of an anode member and/or a cathode member.

In FIG. 4A the top view of a solid electrolyte member 402 is presented and cross-sectional view at the indicated location of the cross-section. In this embodiment, the solid electrolyte member 402 is formed with many identically-shaped and sized valleys or depressions 404 in both sides (major faces) 406, 408 (top and bottom sides in this illustration) of the solid electrolyte layer member. The valleys 404 are arranged in an ordered format of parallel lines in both directions of the rectangular faces of the electrolyte member 402. The otherwise flat side surfaces 406, 408 of the solid electrolyte member 402 present themselves for face-to-face contacts with compatibly-shaped projections on facing side surfaces of anode and cathode members of the cell.

FIG. 4B illustrates a disordered pattern of individual valleys 414 in a face 416 of a cell solid electrolyte member 412. Solid electrolyte layer member 412 is formed with many identically-shaped valleys or depressions 414 in both sides 416, 418 (top and bottom sides in this illustration) of the solid electrolyte layer member. The valleys 414 are arranged in a dis-ordered format in both directions of the rectangular faces 416, 418 of the electrolyte member 412. The otherwise flat side surfaces 416, 418 of the solid electrolyte member 412 present themselves for face-to-face contacts with compatibly-shaped facing side surfaces (with valley-filling projections) of anode and cathode members of the cell.

Figure 4C:
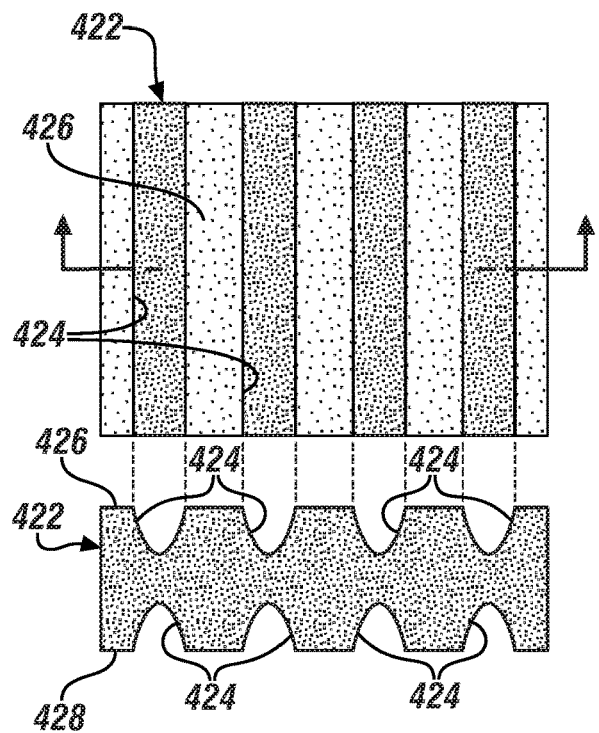

FIG. 4C illustrates an ordered pattern of rows of valleys in an otherwise flat face (upper and lower major faces 426, 428 of a cell member 422. Solid electrolyte layer member 422 is formed with four parallel identically-shaped valleys or depressions 424 in both sides 426, 428 (top and bottom sides in this illustration) of the solid electrolyte layer member 422. The valleys 424 are arranged in a parallel, ordered format in both rectangular faces 426, 428 of the electrolyte member 422. The otherwise flat side surfaces 436, 438 of the solid electrolyte member 422 present themselves for face-to-face contacts with compatibly-shaped facing side surfaces (with valley filling projections) of anode and cathode members of the cell.

Figure 4D:
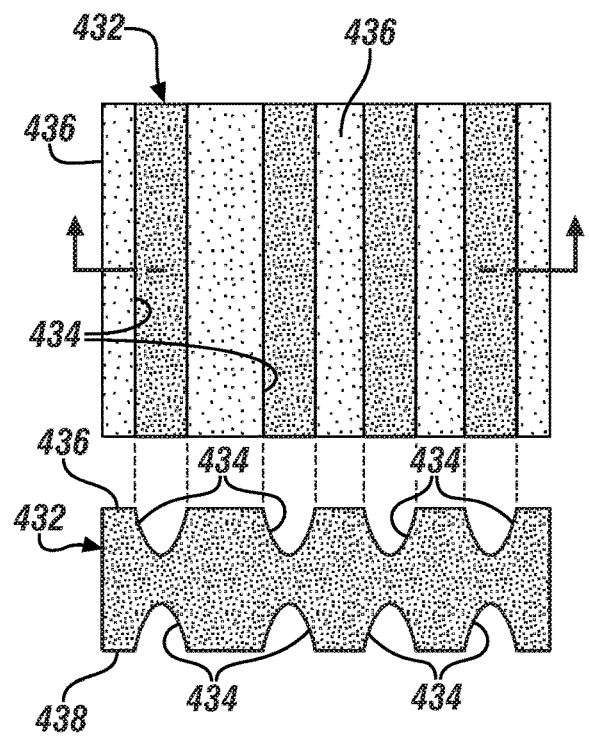

And FIG. 4D illustrates a dis-ordered pattern of rows of intervening valleys on a face of a cell member 432. Solid electrolyte layer member 432 is formed with four parallel identically-shaped valleys or depressions 434 in both otherwise flat sides 436, 438 (top and bottom sides in this illustration) of the solid electrolyte layer member 432. The valleys 434 are arranged in a dis-ordered format in both rectangular faces 426, 428 of the electrolyte member 432. The otherwise flat side surfaces 436, 438 of the solid electrolyte member present themselves for face-to-face contacts with compatibly-shaped facing side surfaces of anode and cathode members of the cell.

Figure 5:
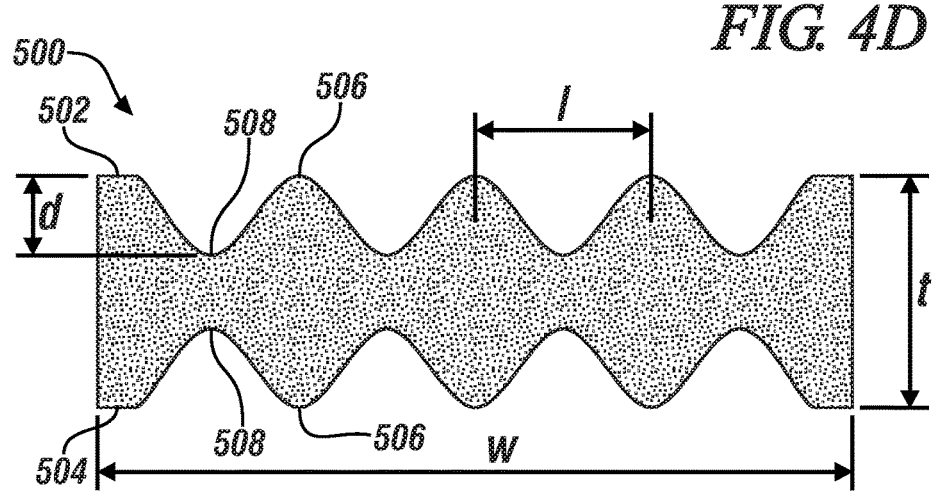
FIG. 5 is schematic side view of ordered rows of projections and intervening valleys on a face of a cell member for the purpose of illustrating dimensions of the cell member and the projections and valleys on a face of the cell member.

FIG. 5 is schematic, side, cross-sectional view of ordered rows of curved projections and intervening valleys forming opposing major faces 502, 504 of a solid electrolyte member 500 for the purpose of illustrating dimensions of the cell member and the projections and valleys on a face of the cell member.

In the illustration of FIG. 5, a solid electrolyte member 500 has a width, w, based on a predetermined size and a thickness (t) separating two opposing faces 502, 504. Each face is formed with a uniform pattern of uniformly curved projections 506 and reverse-shaped, interspaced valleys 508 extending along the length (not illustrated) of the solid electrolyte member 500. As illustrated, the tops of the projections 506 on each side of the solid electrolyte member extend to the same level, but not necessarily the same level on opposing sides. And the depths of the valleys 508 extend to common levels. As described in this specification, the solid electrolyte layers are relatively thin. In accordance with this disclosure, the over-all thickness (t) of the solid electrolyte layer 500 is typically in the range of a few micrometers up to about 1000 micrometers (one millimeter). As illustrated in FIG. 5 this thickness measurement includes the top levels of the formed projections 506.

The overall width (w) of the solid-state electrolyte member 500 depends on the design of each cell. The distance (d) between the top of a projection 506 and the depth of the adjacent valley 508 is suitably up to, but no greater than the thickness (t) of the solid electrolyte layer. And the spacing (l) between the centers of the projections is suitably up to about five times the value of d. The value of d and l of each valley 508 may differ from each other or be the same. As stated above in this specification, it is preferred that the minimum dimensions of the projections and recesses be larger than average representative sizes of the particles making up the layer of solid electrolyte material.

Figure 6:
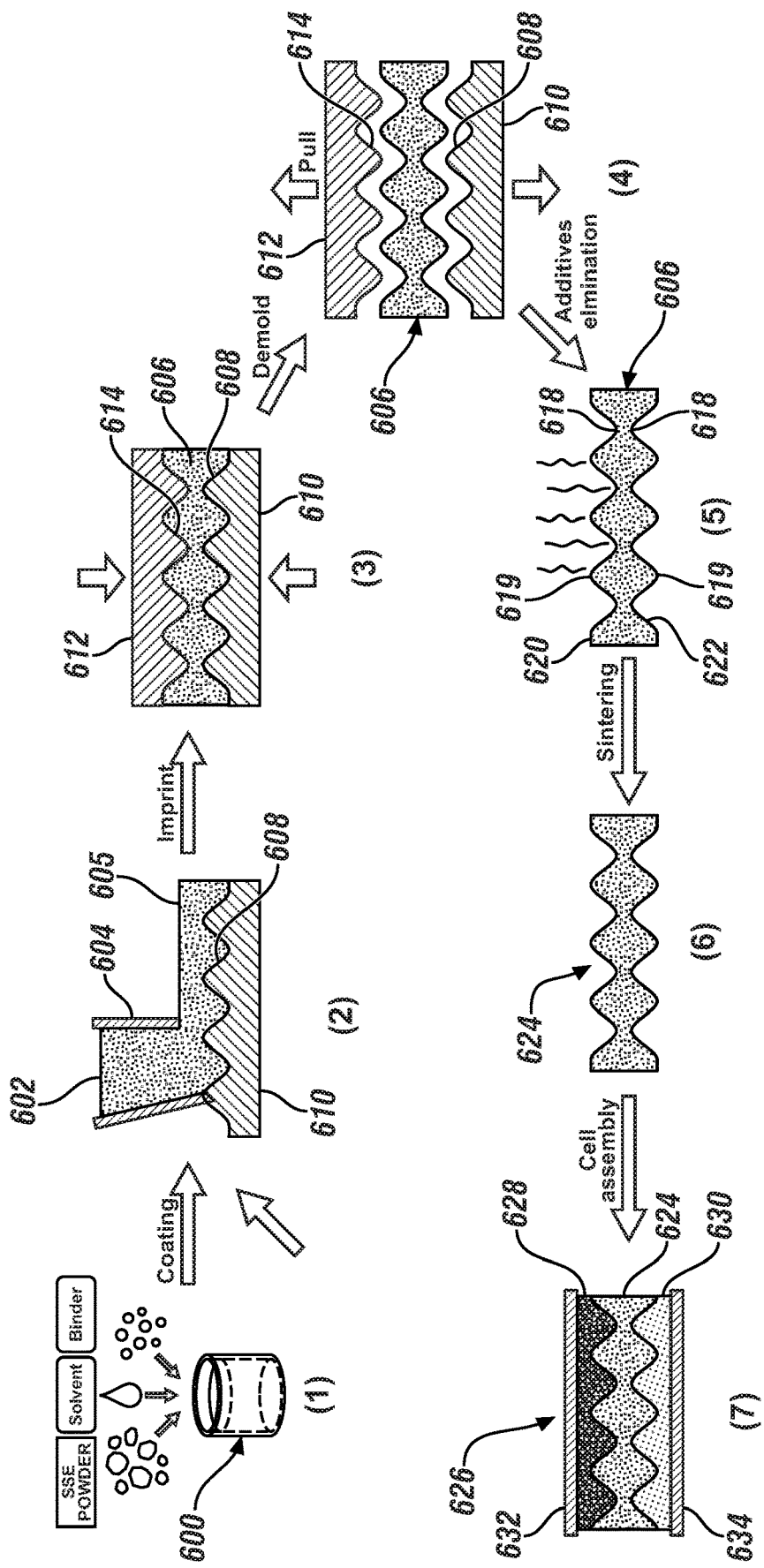
FIG. 6 is an exemplary schematic flow diagram of a method of forming a solid electrolyte member with topographically patterned opposing faces for assembly with an anode member and cathode member in the assembly of a lithium-ion cell.

FIG. 6 is an exemplary schematic flow diagram of a method of forming a solid electrolyte member with topographically patterned opposing faces for assembly with an anode member and cathode member in the assembly of a lithium-ion cell. A like method may be employed for preparing a suitable layer of anode active material and a layer of cathode active material with a mating topographically patterned facial surface for placement against a solid electrolyte member, with or without an interposed interlayer film.

In a first step (1), a suitably processible (for molding) mixture of particles of solid-state electrolyte (SSE) material, and suitable polymeric binder material, which may include a solvent, are prepared in a container 600 or other vessel for use in molding a solid electrolyte layer with topographically patterned opposing facial sides. The mixture may be in the form of a slurry 602 which can be applied through a tube or duct 604 and coated (step 2) as a film layer 605 onto a suitably-shaped, parallel, hill (projections) and valley (recesses) surface 608 of a mold member 610. An opposing mold member 612 with a like mold surface 614 is applied with pressure (step 3) to the opposite side of the solid electrolyte layer 606. Heat may be applied during the molding of the in-process molded solid electrolyte layer 606.

One side edge of the rectangular shape of the in-process molded solid electrolyte layer 606 is illustrated in this sequence of processing steps. This molding process may be used to form individual solid electrolyte material layers (or anode or cathode material layers) or sheets of the cell members from which several individual electrolyte layers or electrode layers may be cut or otherwise separated.

The molded layer 606 of solid electrolyte material is removed (step 4) from the opposing mold members 610, 612, and, if necessary, solvent or other vaporous material is removed (step 5). In this embodiment, the solid electrolyte layer 606 has been formed with four generally equally spaced, parallel, smoothly curved hills 619 and valleys 618 extending across the opposing facial sides 620, 622 of the molded surfaces 614. If required in the processing of the selected material, the molded layer may be heated or sintered (step 6) to complete the binding of cell material into a handleable, molded, dense solid electrolyte layer member 624. Solid electrolyte member 624 may then be assembled (step 7) into a cell package 626, comprising the solid electrolyte member 624 sandwiched between anode member 628 and cathode member 630 and their respective current collectors 632, 634.

Methods to prepare a solid electrolyte layer with topographically patterned opposing facial sides are not limited to this illustration. But depending of the solid electrolyte layer and the intended shapes of its opposing sides, other processes may be used such as melt casting, laser etching and the like. Of course, the specified shapes of the contacting surfaces of the solid electrolyte layer require that the associated anode and cathode material layers be formed with compatible, closely engaging surfaces.

Examples of Materials for Use in a Solid State Lithium Ion Battery Cell

Examples of suitable oxide-based solid state electrolyte materials include, e.g., perovskite type ($Li_{3x}La_{2/3-x}TiO_3$), NASICON type ($LiTi_2(PO_4)_3$), $Li_{1+x}Al_xTi_{2-x}(PO_4)_3$ (LATP), $Li_{1+x}Al_xGe_{2-x}(PO_4)_3$ (LAGP), $Li_{1+x}Y_xZr_{2-x}(PO_4)_3$ (LYZP), LISICON type ($Li_{14}Zn(GeO_4)_4$), Garnet type ($Li_{6.5}La_3Zr_{2-x}Te_xO_{12}$).

Examples of suitable sulfide-based solid-state electrolyte materials include, e.g., $Li_2S$—$P_2S_5$, $Li_2S$—$P_2S_5$-$MS_x$, LGPS ($Li_{10}GeP_2S_{12}$), thio-LISICON ($Li_{3.25}Ge_{0.25}P_{0.75}S_4$), $Li_{3.4}Si_{0.4}P_{0.6}S_4$, $Li_{10}GeP_2S_{11.7}O_{0.3}$, lithium argyrodite $Li_6PS_5X$ (X=Cl, Br, or I), $Li_{9.54}Si_{1.74}P_{1.44}S_{11.7}Cl_{0.3}$, $Li_{9.6}P_3S_{12}$, $Li_7P_3S_{11}$, $Li_9P_3S_9O_3$, $Li_{10.35}Ge_{1.35}P_{1.65}S_{12}$, $Li_{10.35}Si_{1.35}P_{1.65}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$.

Examples of suitable polymer-based solid-state electrolyte materials include the polymer host together with a lithium salt which act as a solid solvent. Examples of polymer hosts include PEO, PPO, PEG, PMMA, PAN, PVDF, PVDF-HFP, PVC. Examples of lithium salts include, e.g., lithium bis(trifluoromethane) sulfonimide (LiTFSI), lithium hexafluorophosphate ($LiPF_6$), lithium tetrafluoroborate ($LiBF_4$), lithium bis(trifluoromethane) sulfonimide (LiFSI), lithium perchlorate ($LiClO_4$) and so on.

Other solid electrolyte materials include the nitride-based SSE: e.g. $Li_3N$, $Li_7PN_4$, $LiSi_2N_3$; the hydride-based SSE: e.g. $LiBH_4$, $LiBH_4$—LiX (X=Cl, Br or I), $LiNH_2$, $Li_2NH$, $LiBH_4$—$LiNH_2$, $Li_3AlH_6$; the halide-based SSE: e.g. LiI, $Li_2CdCl_4$, $Li_2MgCl_4$, $Li_2CdI_4$, $Li_2ZnI_4$, $Li_3OCl$; the borate-based SSE: e.g. $Li_2B_4O_7$, $Li_2O$—$B_2O_3$—$P_2O_5$; and inorganic SE/polymer-based hybrid electrolyte.

Suitable interlayer compositions include for example:
(a) Inorganic interlayer (e.g., 70% $Li_2S$—29% $P_2S_5$—1% $P_2O_5$).
(b) Polymer-based interlayer (e.g., poly (ethylene glycol) methyl ether acrylate with $Al_2O_3$ and LiTFSI; polyethylene oxide with LiTFSI; poly(vinylidene fluoride) copolymer with hexafluoropropylene (PVDF-HFP)-Based gel electrolyte.).
(c) Metal/metal oxide (e.g., Nb, Al, Si or $Al_2O_3$).

A suitable interlayer may comprise a liquid electrolyte—an ionic liquid (e.g., Li(triethylene glycol dimethyl ether) bis(trifluoromethanesulfonyl)imide (Li(G3)TFSI),), traditional carbonate-based electrolyte (e.g., $LiPF_6$/EC/DEC with additives), highly concentrated electrolytes (LiTFSA in acetonitrile)

A suitable interlayer may comprise hybrid combinations of above compositions.

Suitable cathode layer materials include a mixture of particles of cathode active material and particles of solid electrolyte material:
(a) Examples of cathode active material include:
rock salt layered oxides, e.g. $LiCoO_2$, $LiNi_xMn_yCo_{1-x-y}O_2$, $LiNi_xMn_{1-x}O_2$, $Li_{1+x}MO_2$, etc.; spinel cathode, e.g. $LiMn_2O_4$, $LiNi_xMn_{1.5}O_4$; Polyanion cathode, (1) phosphate, e.g. $LiV_2(PO_4)_3$ etc., (2) Silicate, e.g. $LiFeSiO_4$; Coated and/or doped cathode materials mentioned previously are included
(b) At least one type of SSE picked he above paragraphs.
(c) Additives: binders (if needed), conductive carbon particles.
(d) Current collector, e.g. Al foil, carbon coated Al foil and so on Suitable anode layer materials include:
(a) Anode active material,
wherein lithium titanium oxide, e.g. $Li_4Ti_5O_{12}$, metal oxide (e.g., $V_2O_5$ and the like), metal sulfide (e.g., FeS and the likes); Li metal and Li alloy; Si and silicon-alloys; carbonaceous anode, e.g. CNTs, Graphite and graphene are included
(b) At least one type of SSE picked from the above paragraphs
(c) Additives: binders (if needed), carbon and so on
(d) Current collector, e.g. Cu foil, Al foil carbon coated Al foil and so on The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:
1. A solid-state lithium-ion battery cell comprising:
a solid electrolyte layer member comprising a predetermined amount of solid electrolyte particles, the solid electrolyte layer member having a first side for placement in lithium ion-transport contact with a layer of anode active material and an opposing side for placement in lithium ion-transport contact with a layer of cathode active material, both of the first and opposing sides of the solid electrolyte layer member having a surface characterized by a lopolgical surface pattern of projections and adjacent recesses between the projections extending into the solid electrolyte layer, the pattern of recesses increasing the area of the shaped surface and shortening the ion transport distance as compared with a flat surface, the thickness of the solid electrolyte layer member being 5 micrometers to about 1000 micrometers;
an anode layer member having opposing sides and a uniform thickness of 5 micrometers to 500 micrometers, the anode layer member comprising a bonded mixture of particles of anode active material and solid electrolyte particles, the respective particles having maximum dimensions in the nanometer and micrometer range of 2 nanometers to 500micrometers, the anode layer member having a side facing toward, and coextensive with, an opposing side of the solid electrolyte layer member and shaped for lithium ion-transport contact with the facing side of the solid-electrolyte layer member; and a cathode layer member having opposing sides and a uniform thickness of 5 micrometers to 500 micrometers, the cathode layer comprising a bonded mixture of particles of cathode active material and solid electrolyte particles, the respective particles having maximum dimensions in the nanometer and micrometer range of 2 nanometers to 500 micrometers, the cathode layer member having a side facing toward, and coextensive with, an opposing side of the solid electrolyte layer member and shaped for lithium ion-transport contact with the facing side of the solid electrolyte layer member.

2. A solid-state lithium-ion battery cell as stated in claim 1 in which an interlayer film is placed between one of the sides of the solid-state electrolyte member and at least one of the contacting side of the anode layer member and the contacting side of the cathode layer member.

3. A solid-state lithium-ion battery cell as stated in claim 1 in which the solid electrolyte layer member is formed with the topographical surface pattern on both of its sides and an interlayer film is placed between the sides of the solid-electrolyte layer member and the contacting side of the anode layer member and the contacting side of the cathode layer member.

4. A solid-state lithium-ion battery cell as stated in claim 1 in which the topographical surface pattern on one or both sides of the solid electrolyte layer member is characterized by equally spaced rows of continuous recesses extending across the sides of the solid electrolyte member.

5. A solid-state lithium-ion battery cell as stated in claim 1 in which the topographical pattern formed on one or both sides of the solid electrolyte layer member is characterized by equally-spaced rows of individual recesses extending over the side of the solid electrolyte layer member.

6. A solid-state lithium-ion battery cell as stated in claim 1 in which the depths of the recesses being equal or unequal and less than one-half the thickness of the solid electrolyte layer member, and the spacing of the rows of recesses are no greater than five-times the depth of the recesses.

7. A solid-state lithium-ion battery cell as stated in claim 1 in which a topographical pattern is formed on both sides of the solid electrolyte layer member, the topographical pattern being characterized by equally-spaced rows of recesses or of individual recesses extending across each side of the solid electrolyte member, and the equally spaced rows of recesses or of individual recesses on opposing sides of the solid electrolyte layer member are aligned with each other.

8. A solid-state lithium-ion battery cell comprising:
a solid electrolyte layer member comprising a predetermined amount of solid electrolyte particles, the solid electrolyte layer having a first side surface for placement in surface-to-surface, lithium ion-transport contact with a side surface of a layer member of anode active material and an opposing side surface for placement in surface-to-surface, lithium ion-transport contact with a side surface of a layer member of cathode active material, each side of the solid electrolyte layer member having a shaped surface such that both of the sides each has a surface characterized by a topographical pattern of projections and adjacent recesses between the projections, the topographical pattern increasing the area of the formed surface as compared with a flat surface, the thickness of the solid electrolyte layer member being 5 micrometers to 1000 micrometers;

an anode layer member which is coextensive with the solid electrolyte layer member and having opposing side surfaces and a uniform thickness of 5 micrometers to 500 micrometers, the anode layer member comprising a bonded mixture of particles of anode active material and solid electrolyte particles, the respective particles having maximum dimensions in the nanometer and micrometer range of 2 nanometers to 500 micrometers, the anode layer member having a side surface facing toward an opposing side surface of the solid electrolyte layer member and shaped for surface-to-surface, lithium ion-transport contact with the side surface of the solid-electrolyte layer member, and a cathode layer member which is coextensive with the solid electrolyte layer member and having opposing side surfaces and a uniform thickness of 5 micrometers to 500 micrometers, the cathode layer comprising a bonded mixture of particles of cathode active material and solid electrolyte particles, the respective particles having maximum dimensions in the nanometer and micrometer range of 2 nanometers to 500 micrometers, the cathode layer having a side surface facing toward an opposing side surface of the layer of solid electrolyte particles and shaped for surface-to-surface lithium ion-transport contact with the side surface of the solid electrolyte layer member.

9. A solid-state lithium-ion battery cell as stated in claim 8 in which an interlayer film is placed between at least one side of solid electrolyte member and at least one of the contacting side of anode layer member and the contacting side of the cathode layer member.

10. A solid-state lithium-ion battery cell as stated in claim 8 in which the topographical pattern formed on both side surfaces of the solid electrolyte layer member is characterized by equally-spaced rows of projections and adjacent recesses.

11. A solid-state lithium-ion battery cell as stated in claim 8 in which the topographical pattern is formed on both side surfaces of the solid electrolyte layer member, the topographical patterns being characterized by equally-spaced rows of projections and adjacent recesses extending across each side of the solid electrolyte member, and the equally spaced rows of projections and adjacent recesses on opposing sides of the solid electrolyte layer member are aligned with each other.

* * * * *